Aug. 29, 1967
W. P. SCHMID ET AL
3,337,898
VIBRATING VACUUM HEAD
Filed Sept. 28, 1964
4 Sheets-Sheet 2
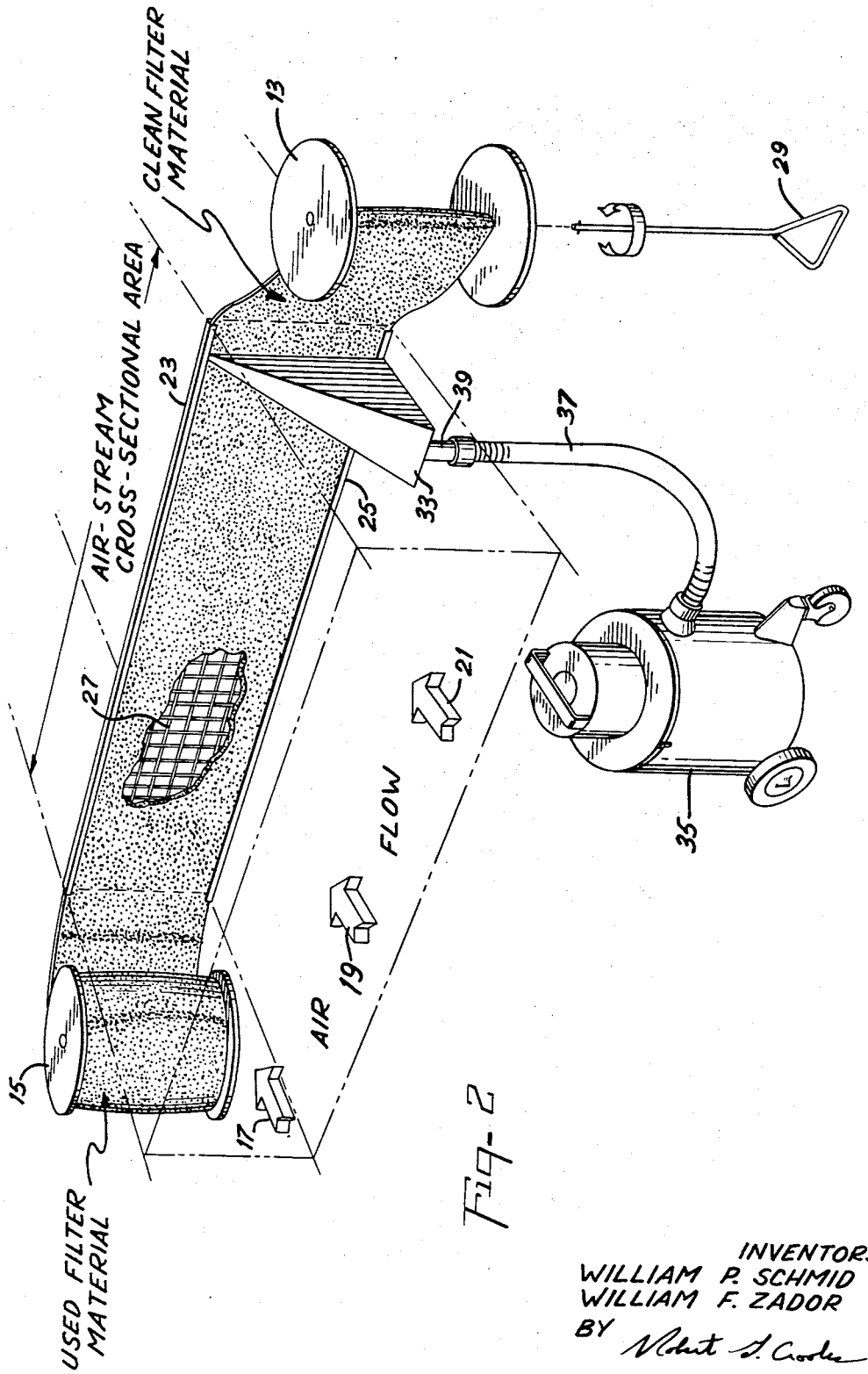
INVENTORS.
WILLIAM P. SCHMID
WILLIAM F. ZADOR
BY
ATTORNEY

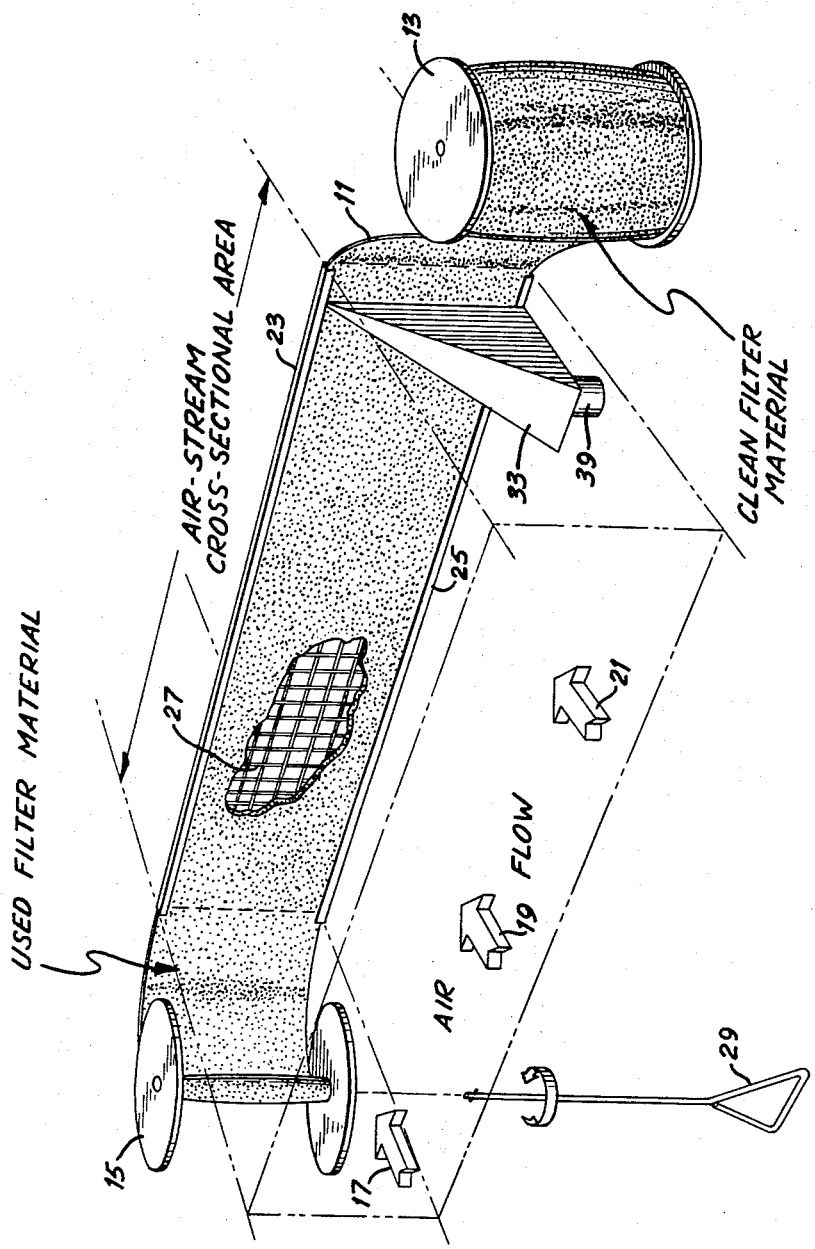

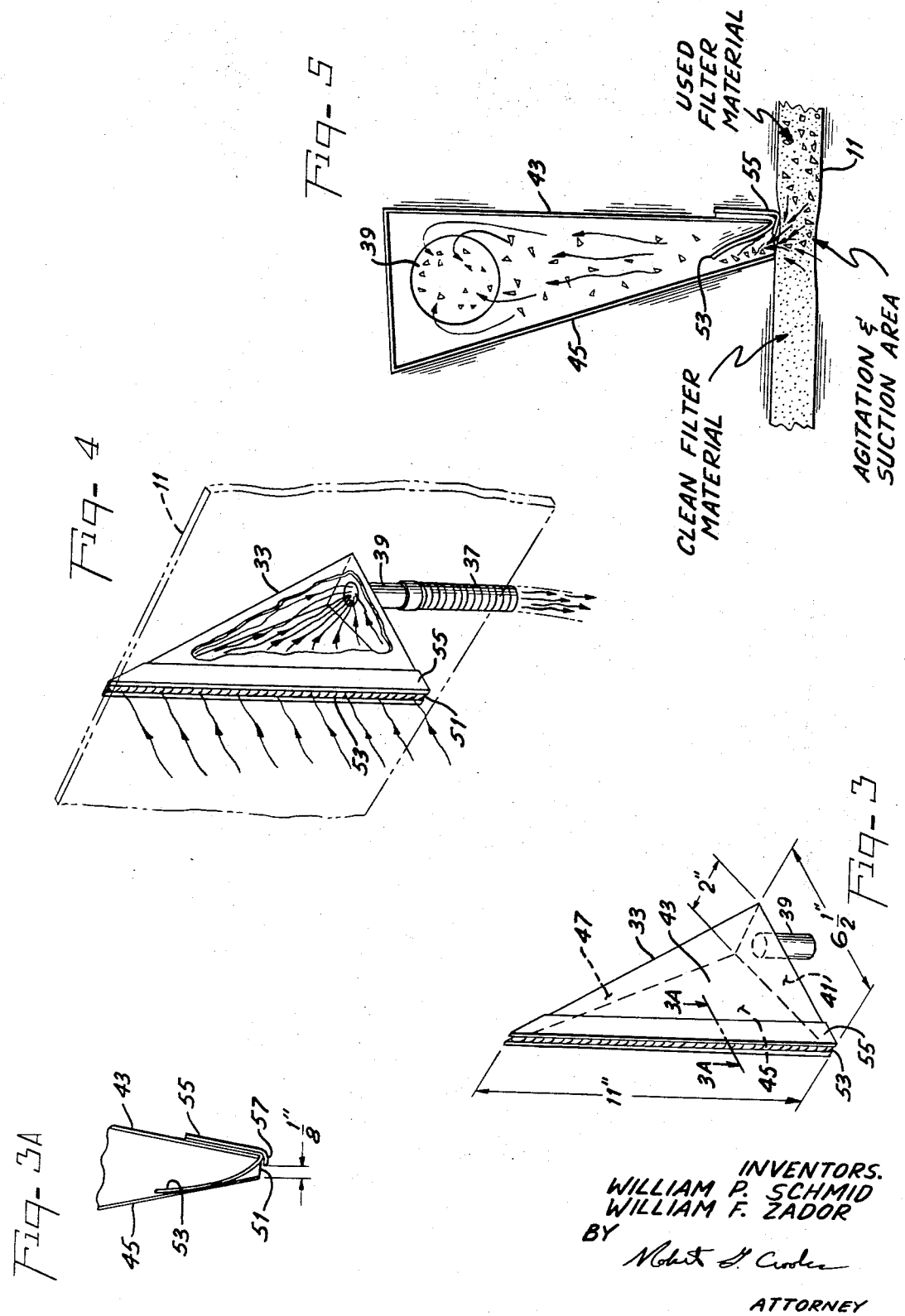

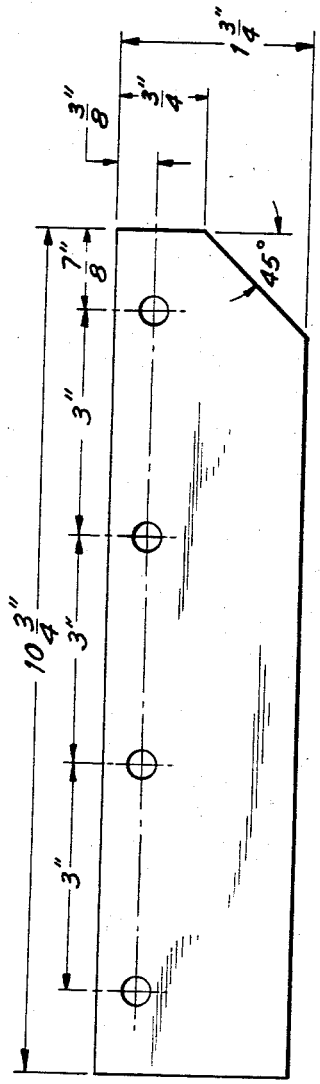
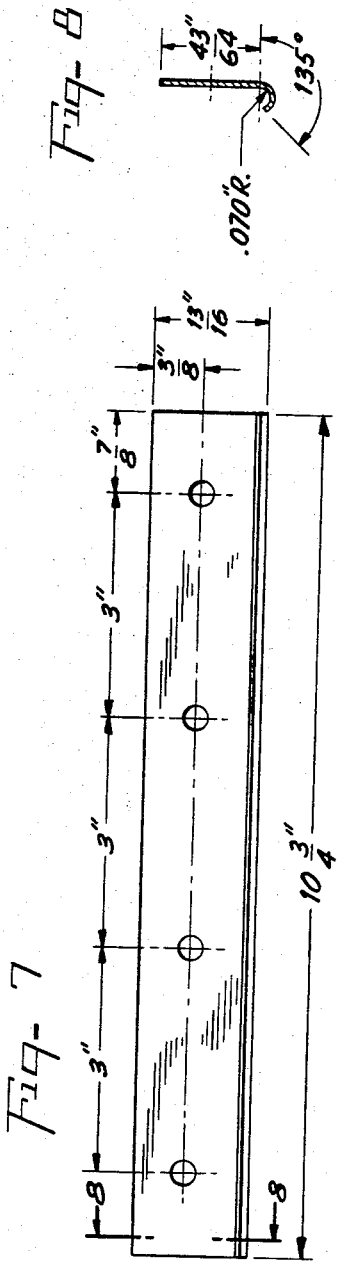

United States Patent Office 3,337,898
Patented Aug. 29, 1967

3,337,898
VIBRATING VACUUM HEAD
William P. Schmid and William F. Zador, Philadelphia, Pa., assignors to International Telephone and Telegraph Corporation, Nutley, N.J., a corporation of Maryland
Filed Sept. 28, 1964, Ser. No. 399,436
9 Claims. (Cl. 15—404)

ABSTRACT OF THE DISCLOSURE

A head for use in conjunction with a vacuum system for cleaning fibrous materials such as the filter belts in air handling equipment. The head is tapered to have a cross section decreasing in the direction away from the vacuum system.

---

This invention relates to a vibrating head for use in the cleansing of materials by a process of combined suction and agitation.

More particularly, this invention relates to a vibrating head which is especially adapted for the cleaning of filter materials as employed in air conditioners and in other types of air-handling equipment.

Still more particularly, this invention relates to a head which can be built into air-handling equipment and to which a commercial vacuum cleaner can be temporarily attached while the filter material in the air-handling equipment is passed across the vacuum head for periodic cleaning. According to the invention, the vibrations induced in the vacuum head by the passage of air therethrough are transmitted to the filter material in order to agitate and shake loose the firmly lodged particles of dirt which have become entrained in the filter material.

As is well known, air filters are employed in many different types of air-handling equipment in order to remove from the air passing through the equipment the dirt and other impurities carried by the air. Such removal of dirt and other impurities from the air passing through the air-handling equipment not only protects the components of the air-handling equipment but also prevents the dirt and impurities from being passed along through the air-handling equipment to the room or other space to which the air (or other fluid) is being supplied. The filtration of air has become especially important in air conditioners which not only cool and dehumidify the air supplied to the conditioned spaces but also should clean the air before supplying it to their spaces. In passing large quantities of air through filters in order to clean the air, the filter gradually becomes very dirty, thereby resulting in a reduction of the rate of air flow and of the efficiency of the filter. Hence, it becomes important to provide some means for periodically cleaning the filter material in air conditioners and other types of air-handling equipment.

The filter materials which are employed in conjunction with air-handling equipment are of many different types, but may generally be classified as either permanent types of materials or disposable types of materials. The disposable filter materials are usually the inexpensive materials which can economically be thrown away when they become dirty. It is with the permanent types of filter materials that this invention is most likely to be used. These permanent materials are often installed in air-handling equipment when such equipment is built, and remain in the equipment for long periods of time, perhaps even for the entire life of the equipment. Thus, it is very desirable to be able to clean the filter material in situ without removing it from the equipment in which it is installed. In many prior-art types of air-handling equipment, it has been necessary to remove the filter material from the equipment in order to do a thorough job of cleaning it.

On the other hand, there have been some prior-art types of air-handling equipment in which the filter material remained in the equipment but could not be thoroughly cleaned because of the inability to bring adequate suction and agitation effects to bear upon the filter material while it remains within the air-handling equipment.

Accordingly, it is an object of this invention to provide a vacuum head which is useful in cleaning the filter material installed in many different types of air-handling equipment.

It is another object of this invention to provide a vacuum head which is capable not only of applying suction evenly to the filter material installed in air-handling equipment but which is capable also of agitating the material in order to shake loose the particles of dirt and other foreign substances which are deeply embedded in the fibers of the filter material.

It is still another object of this invention to provide a vacuum head which may be permanently installed in air-handling equipment, available for use at any time, and which is simple, rugged, and inexpensive in its construction.

Briefly, we have fulfilled these and other objects of our invention by providing a vibrating vacuum head which comprises a substantially tetrahedron-shaped hollow body along one edge of which is a narrow slot which may be applied to the filter material that is to be cleaned. Provision is made for connecting a commercial type of vacuum cleaner through a hose to one face of the tetrahedron-shaped hollow body in order that the air drawn through the filter material and the hollow body by the vacuum cleaner will pass through the narrow slot which bears against the filter material. Mounted adjacent the slot at the edge of the hollow body is a strip of flexible material which is caused by the flow of air through the slot to vibrate vigorously. These vibrations cause the hollow body also to vibrate and to transmit vibrations to the filter material itself, resulting in the agitation and loosening of the dirt and other foreign particles in the filter material in order that they may be drawn through the slot into the hollow body and thence to the vacuum cleaner. Provision is made for equalizing the suction and the agitation along the length of the slot where it bears against the filter material.

For a complete understanding of our invention, reference should now be made to the following detailed specification, taken in conjunction with the drawings, in which:

FIGURE 1 is a perspective view of an assembly including the vibrating vacuum head and a filter belt such as may be installed in an air conditioner, or other air-handling equipment;

FIGURE 2 is a perspective view of the air-handling equipment shown in FIGURE 1, in which the filter belt has been advanced from a supply spool to a take-up spool during operation of the air-handling equipment until the entire length of the filter belt has become dirty, thereby requiring cleaning of the filter belt while it is rewound onto the supply spool. A commercial vacuum cleaner is shown connected to the vibrating vacuum head for this purpose;

FIGURE 3 is a phantom view of the vibrating vacuum head, illustrating in a three-dimensional manner the tetrahedron shape which has been found to be best for the hollow body of the vacuum head;

FIGURE 3A is a sectional view taken on the plane 3A—3A of FIGURE 3;

FIGURE 4 is a partly cut-away perspective view of the vibrating vacuum head, illustrating the path of flow of air through the filter, through the vibrating vacuum head, and into the hose which leads to the vacuum cleaner;

FIGURE 5 is a sectional view through the vibrating vacuum head, illustrating the way in which air passing through the filter material into the vibrating vacuum head causes a flapper of thin flexible material attached to the vibrating vacuum head to oscillate, thereby transmitting vibrations to the head and thence to the filter material;

FIGURE 6 illustrates a preferred configuration of the flapper;

FIGURE 7 illustrates a metal tab for retaining the flapper in place on the vibrating vacuum head; and FIGURE 8 is a sectional view taken on the plane 8—8 of FIGURE 7.

Turning now to FIGURE 1 of the drawings, we find illustrated a filter assembly including a filter belt 11, a supply spool 13 for the filter belt, and a take-up spool 15 for the filter belt. It will be assumed that the material of filter belt 11 is a permanent material which is intended to be used repeatedly and is to be cleaned periodically between its respective cycles of use. The material of the filter belt 11 is likely to comprise at least one fibrous layer applied to a layer of fabric which lends strength to the filter belt while retaining flexibility in order that the filter belt may be wound and unwound repeatedly from its supply spool and take-up spool. In the representation of FIGURE 1, the arrows 17, 19, and 21 indicate the direction of air flow, substantially perpendicular to the plane of that portion of the filter belt which is in operation, and through the filter belt to the place of utilization of the air stream. The portion of the filter belt which is in filtering operation may be supported between a pair of guide channels 23 and 25 which restrict the upward and downward motion of the filter belt while allowing motion of the filter belt parallel to the length of the channels. A back-up screen 27 positioned behind the filter belt supports it against the force of the air flow and prevents the filter belt from "bowing" as the air passes through it.

The portion of the filter belt which is in actual filtering operation is the portion supported between guide channels 23 and 25 for through passage of the air. When the filter belt has been exposed to the air flow for a sufficient period of time to become dirty in removing particles of dirt from the air, an increment of the filter belt may be wound onto take-up spool 125 by means of a manual reeling crank 29, which enables an operator to rotate take-up spool 15. When the increment of filter belt between guide channels 23 and 25 has in turn become soiled with dirt from the air stream passing therethrough, it may also be wound onto take-up spool 15, exposing a new increment of filter belt to the air flow. This process of using successive increments of the filter belt until each becomes dirty, and then winding the dirty portion onto the take-up spool may be continued until the entire available length of the filter belt has been transferred from supply spool 13 to take-up spool 15 and has become entirely dirty.

It will be understood that the process of periodically winding dirty increments of the filter belt onto the take-up spool may be accomplished by means of automatic controls if desired. However, for the purposes of illustration of this invention, it will suffice to assume that the filter belt is moved by manual means, such as by the reeling crank 29 inserted into the take-up spool 15.

When the entire length of filter belt has been unreeled from supply spool 13, it will not be possible further to turn the take-up spool 15, and the filter belt may not be advanced further because one end of the filter belt is attached to the spindle of supply spool 13. When resistance to the turning of reeling crank 29 makes it apparent that the entire length of the filter belt has been used, it becomes necessary to clean the filter belt and to rewind it onto supply spool 13. In accordance with our invention, it is possible to clean the filter belt and rewind it onto the supply spool without removing the filter belt from the air-handling equipment and without using any liquid cleaning medium.

The cleaning of the filter belt and the rewinding of the filter belt onto supply spool 13 are accomplished by inserting manual reeling crank 29 into supply spool 13 and rotating the crank while the filter belt is moved in contact with our novel vibrating vacuum head 33, to which has been connected a commercial type of vacuum cleaner 35 by means of a flexible hose or other conduit 37. The end of hose 37 mates with a tube 39 which is set into one face of the hollow body which comprises vibrating vacuum head 33. This process is illustrated in FIGURE 2 of the drawings, wherein it will be noted that reeling crank 29 is now positioned for rotation of supply spool 13 rather than take-up spool 15.

Cleaning of the filter belt and its rewinding onto the supply spool are accomplished by slowly rotating reeling crank 29 while vacuum cleaner 35 is in operation. As supply spool 13 is slowly rotated, the filter belt is drawn across the edge of vibrating vacuum head 33, which simultaneously applies suction to the filter belt and also agitates the filter belt strenuously in order to shake loose the particles of dirt which have become entrained in the fibers of the filter-belt material.

It will be noted that the vibrating vacuum head 33 is positioned in such a way that its edge is in contact with the surface of the filter belt from its upper margin to its lower margin so as to clean the entire width of the filter belt. When the filter belt has been entirely payed out from take-up spool 15 and as much of it as possible has been rolled onto supply spool 13, the cleaning operation will have been completed, and vacuum cleaner 35 may be turned off. Flexible hose 37 may then be disconnected from tube 39, and vacuum cleaner 35 may then be connected to another unit or air-handling equipment in order to clean the filter-belt material in that unit. Thus it will be observed that each unit or air-handling equipment is provided with a fixture to which a commercial vacuum cleaner may periodically be connected in order to perform the cleansing operation on the filter belt of that unit or air-handling equipment. There is no need to build into the unit a vacuum-cleaning apparatus, and yet the most efficient possible vibrating vacuum head is at all times available in the unit for use whenever cleaning of the filter belt becomes necessary.

Turning now to FIGURE 3 of the drawings, we shall examine the features of vibrating vacuum head 33 which make possible its unique operation. In FIGURE 3 of the drawings, we find a representation of the configuration of the vibrating vacuum head itself, showing clearly the irregular tetrahedron configuration which we have found to be preferable for this purpose. The vibrating vacuum head comprises a base 41, a first side wall 43, a second side wall 45, and a back wall 47. Each of these members is triangular in its outline and is joined to the other members at its edges. The base 41 has attached thereto a short length of round tube 39 having an outer dimension such that the flexible hose 37 of a standard vacuum cleaner 35 can be slipped over it and frictionally held in place. The joints between all of the edges of the faces of the tetrahedron are tight except for the joint between first side wall 43 and second side wall 45, which joint has a linear slot 51 running the entire length of the joint between the two side walls, that is, the entire height of vacuum head 33. We have found that a slot width of one-eighth inch is a suitable dimension in a vibrating vacuum head having a height of eleven inches, such as might be employed in conjunction with commercial vacuum cleaners of approximately three-quarters horsepower.

Reference now to FIGURE 3A, which is a fragmentary sectional view taken along the plane 3A—3A in FIGURE 3, shows how a piece of flexible material which we call a flapper 53 is secured by a rigid tab member 55 to one of the side walls of the vacuum head such as first side wall 43. The edge 57 of tab member 55 is curved in such a way as to direct the flapper 53 through the slot 51 into the interior of the vibrating vacuum head. The tab member 55 may be riveted through the edge of the flapper material to the edge of first side wall 43 of the vacuum head, in order to hold firmly one edge of the flapper 53.

We have found that a good material for the flapper 53 is a nylon fabric impregnated with a synthetic rubber material produced by E. I. du Pont de Nemours and Company under the trademark "Fairprene." The thickness of this material is approximately twenty thousandths of an inch. The flapper should, of course, run the entire length of the slot 51 in the edge of the vacuum head, and for this purpose should be approximately ten and three-quarters inches long for use in a vacuum head having a height of elevent inches. In this configuration, we have found that a width of material of one and three-quarters inches is suitable for the flapper, of which three-quarters inch is used for retention in place under tab member 55, while one inch of the flapper material extends through the slot in the interior of the vibrating vacuum head. The tab member 55 should have a length similar to that of the flapper and, as shown in FIGURE 8 of the drawings, should have a curved edge 57 for the purpose of directing the flapper through the slot into the interior of the vibrating vacuum head. Holes are provided in tab member 55 for the accommodation of rivets which hold the tab member 55 and the flapper 53 to the edge of the vibrating-vacuum-head side wall.

It will be understood that these dimensions are exemplary only, and should not in any sense be considered a limitation on the size of the vibrating vacuum head according to our invention. Similarly, the material of the flapper 53 is not limited to the particular material which was mentioned. On the contrary, any suitable flexible material having strength, elasticity, and endurance properties sufficient to permit it to vibrate vigorously for long periods of time might be employed for this purpose.

In addition to the use of the flapper for generating the vibrations of the vacuum head which are then transmitted to the filter material, we have found that the shape of the vibrating vacuum head is important insofar as it permits the low pressure or suction to be equalized along substantially the entire length of the slot 51 in the edge of the vacuum head. The tetrahedron shape for the hollow body of the vibrating vacuum head has been chosen in order to maintain substantially equal degree of suction along the entire length of the slot in the edge of the vibrating vacuum head. This equality of the suction along the length of the slot helps to insure uniform thoroughness of cleaning action across the width of the filter belt and prevents one side of the filter belt from being drawn toward the slot of the vacuum head more than the other side, thereby tending to produce uneven cleaning. We have found that, if the height of the vibrating vacuum head is approximately eleven inches, the edge formed by the intersection of one sidewall with the base may desirably be approximately six and one-half inches, while the width of the base is approximately two inches. In our preferred embodiment of vibrating vacuum head, the edges of the side walls which together define the slot 51 are substantially perpendicular to the plane of the base 41 of the vibrating vacuum head.

The operation of the vibrating vacuum head is further illustrated in FIGURE 4 of the drawings, which shows in a fanciful way a ribbon-shaped stream of air being drawn through filter belt 11 into slot 51, where it flows past flapper 53 and sets the flapper into oscillatory motion. The flapper, through its contact with the filter material and by means of transmission to the filter through the material of the vacuum head itself, agitates the filter material and tends to dislodge any particles of dirt which remain entrained in the filter material. When these particles are dislodged, they are drawn through slot 51 into the vacuum head and thence are passed through tube 39 into flexible hose 37, which delivers them to the vacuum cleaner 35.

FIGURE 5 of the drawings is a sectional view showing a preferable cross-sectional configuration of the vibrating vacuum head, and further illustrating the way in which the flapper 53 is caused to oscillate and, in turn, bring about the agitation of the filter material. The vibration of the flapper 53 and of the vibrating vacuum head are in the audio frequency range and are likely to generate a good deal of noise during the cleaning operation. The frequency range of this noise, and of the oscillations which generate it, can be changed by increasing or decreasing the width of the flapper which protrudes into the interior of the vibrating vacuum head. As has been stated, we have found that a protrusion of approximately one inch of the flapper into the interior of the vacuum head produces most satisfactory results. In the installation of the flapper, we have found that it is preferable to paint the vibrating vacuum head before the flapper is installed, thereby insuring that the flapper material is not contaminated with paint.

By employing the vibrating vacuum head of this invention together with a commercial vacum cleaner, we have been able to achieve a thorough cleaning of an entire filter belt by a single passage of the filter belt over the slotted edge of the vibrating vacuum head. By this single passage of the filter belt across the edge of the vibrating vacuum head, we have been able to achieve much more thorough cleaning than could be obtained by suction alone. When the filter belt has been rewound on the supply spool after cleaning, it is ready to be advanced, increment by increment, through the air-handling apparatus for reuse repeatedly as desired. Thus, the vibrating vacuum head according to our invention not only supplies evenly distributed suction and agitation across the width of the medium to be cleaned, but it also serves as a simple and inexpensive cleaning device which may be permanently installed and which is always available for use at any time that cleaning may be required.

The usefulness of this invention is not limited to the cleaning of filter belts or of filter material, but may be applied to any material from which it is desired to remove particles that have become entrained in the fibers of the material and are difficult to dislodge therefrom. Inasmuch as the vibrating vacuum head has a wide range of applications and is susceptible to a number of modifications within the scope of the inventive concept, we wish it to be understood that the scope of our invention is limited only by the appended claims.

We claim:

1. A head for use in the cleaning of materials, said head comprising a hollow, substantially polyhedron-shaped body, said body having a narrow opening between adjacent edges of two of the face walls of said body, the edge of one of said face walls having attached thereto a flexible material extending from said opening an appreciable distance into the interior of said body, one of the face walls of said body having means for attachment of a conduit within which the fluid pressure may differ from the ambient pressure generally prevailing outside said body, and said substantially polyhedron-shaped body being tapered so as to have a cross section which decreases in the direction away from said one of said face walls of said body having means for attachment of a conduit.

2. A cleaning head for dirty material, said cleaning head comprising a substantially polyhedron-shaped hollow body having an opening between the respective edges of two face walls thereof, one of said edges having fastened thereto a flexible sheet material which extends through said opening and an appreciable distance into the interior of said hollow body, and means attachable to one of the faces of said substantially polyhedron-shaped hollow body for reducing the fluid pressure within said hollow body with respect to the fluid pressure outside said hollow body to induce a flow of fluid through said opening into said hollow body past said flexible sheet material, said body having a cross section which decreases in the direction away from said one of said faces to which said means for reducing the fluid pressure within said hollow body is attachable.

3. A cleaning head in accordance with claim 2 in which said flow of fluid causes vibration of said flexible sheet material and of said hollow body.

4. A cleaning head in accordance with claim 2 for direct contact with said dirty material, in which said flow of fluid causes vibration of said flexible sheet material, of said hollow body, and of said dirty material.

5. A cleaning head in accordance with claim 2, arranged for contact between said dirty material and one of said face wall edges adjacent said opening, whereby vibration of said flexible sheet material is transmitted to said hollow body and to said dirty material.

6. A head for use in the cleaning of materials, said head comprising a substantially tetrahedron-shaped hollow body, said hollow body having a substantially triangular base, first and second substantially triangular side walls joined at their respective first edges to first and second edges of said base, and a substantially triangular back wall joined to a third edge of said base and to respective second edges of said first and second side walls, the respective third edges of said first and second side walls being separated by a narrow slot, one of said side walls having fastened thereto a strip of flexible material which extends through said slot into the interior of said hollow body, and said base being perforated by a hole and having means for connection thereto of a source of low pressure.

7. A head for use in the cleaning of material, said head comprising a substantially tetrahedron-shaped hollow body, said hollow body having a substantially triangular base, first and second substantially triangular side walls joined at their respective first edges to first and second edges of said base, and a substantially triangular back wall joined to a third edge of said base and to respective second edges of said first and second side walls, the respective third edges of said first and second side walls being substantially perpendicular to the plane of said base and being separated by a narrow slot, one of said side walls having fastened thereto a piece of flexible sheet material which extends through said slot into the interior of said hollow body, and said base having means for coupling therethrough to communicate with a fluid of lower pressure than the ambient pressure which prevails outside said hollow body.

8. A head in accordance with claim 7 in which said flexible sheet material comprises nylon fabric impregnated with plastic material.

9. A head in accordance with claim 7 in which said flexible sheet material is secured to said one side wall by a metal tab fastened over said flexible sheet material to the surface of said side wall, said metal tab having an edge which is curved so as to direct a portion of said flexible sheet material through said slot into the interior of said hollow body.

References Cited

UNITED STATES PATENTS

| | | | |
|---|---|---|---|
| 2,364,877 | 12/1944 | Smellie | 55—294 |
| 2,458,258 | 1/1949 | Furr | 15—340 |
| 2,931,061 | 4/1960 | Holtzclaw | 15—312.1 |
| 3,138,818 | 6/1964 | Black | 15—352 X |
| 3,173,776 | 3/1965 | Palmore | 55—294 |

FOREIGN PATENTS 667,452  11/1938  Germany.

ROBERT W. MICHELL, *Primary Examiner.*